US005703438A

United States Patent [19]

Nguyen

[11] Patent Number: 5,703,438
[45] Date of Patent: Dec. 30, 1997

[54] LINE CURRENT FILTER FOR LESS THAN 10% TOTAL HARMONIC DISTORTION

[75] Inventor: Long Thanh Nguyen, El Paso, Tex.

[73] Assignee: Valmont Industries, Inc., Valley, Nebr.

[21] Appl. No.: 589,819

[22] Filed: Jan. 22, 1996

[51] Int. Cl.$^6$ .................................................. H02M 1/12
[52] U.S. Cl. ........................ 315/291; 315/209 R; 333/175
[58] Field of Search ................................ 333/172, 175, 333/176, 178, 181; 315/291, 209 R, 244; 363/45, 46, 47, 48; 323/205, 208

[56] References Cited

U.S. PATENT DOCUMENTS

| | | | |
|---|---|---|---|
| 4,222,096 | 9/1980 | Capewell | 363/44 |
| 4,369,490 | 1/1983 | Blum | 363/48 |
| 4,494,045 | 1/1985 | Davenport | 315/247 |
| 4,511,823 | 4/1985 | Eaton et al. | 315/226 |
| 4,523,131 | 6/1985 | Zansky | 315/307 |
| 4,560,908 | 12/1985 | Stupp et al. | 315/219 |
| 4,672,522 | 6/1987 | Lesea | 363/48 |
| 4,700,113 | 10/1987 | Stupp et al. | 315/224 |
| 4,749,913 | 6/1988 | Stuermer et al. | 315/175 |
| 4,808,887 | 2/1989 | Fahnrich et al. | 315/247 |
| 4,914,559 | 4/1990 | Deisch | 363/48 |
| 4,930,061 | 5/1990 | Slack et al. | 363/44 |
| 4,961,044 | 10/1990 | Kravitz | 323/205 |
| 4,972,124 | 11/1990 | Powers | 315/219 |
| 4,985,664 | 1/1991 | Nilssen | 315/209 |
| 4,994,717 | 2/1991 | Moon | 315/219 |
| 4,999,594 | 3/1991 | Ingman | 333/181 |
| 5,001,400 | 3/1991 | Nilssen | 315/209 |
| 5,012,161 | 4/1991 | Borowiec et al. | 315/247 |
| 5,041,766 | 8/1991 | Flene et al. | 315/219 |
| 5,099,407 | 3/1992 | Thorne | 363/37 |
| 5,144,205 | 9/1992 | Motto et al. | 315/244 |
| 5,148,087 | 9/1992 | Moisin et al. | 315/291 |
| 5,148,359 | 9/1992 | Nguyen | 363/48 |
| 5,148,360 | 9/1992 | Nguyen | 363/48 |
| 5,177,408 | 1/1993 | Marques | 315/291 |
| 5,218,272 | 6/1993 | Jones | 315/247 |
| 5,224,029 | 6/1993 | Newman, Jr. | 363/48 |
| 5,251,120 | 10/1993 | Smith | 363/44 |
| 5,258,692 | 11/1993 | Jones | 315/247 |
| 5,313,142 | 5/1994 | Wong | 315/205 |
| 5,321,337 | 6/1994 | Hsu | 315/219 |
| 5,353,214 | 10/1994 | Kim | 363/56 |
| 5,355,055 | 10/1994 | Tary | 315/209 |
| 5,363,020 | 11/1994 | Chen et al. | 315/209 |
| 5,371,438 | 12/1994 | Bobel | 315/200 |
| 5,378,964 | 1/1995 | Kang | 315/247 |
| 5,387,846 | 2/1995 | So | 315/209 |
| 5,387,849 | 2/1995 | Shridharan | 315/247 |
| 5,394,065 | 2/1995 | Rimmer | 315/277 |
| 5,408,403 | 4/1995 | Nerone et al. | 363/37 |
| 5,559,396 | 9/1996 | Bruning et al. | 315/291 |

*Primary Examiner*—Robert Pascal
*Assistant Examiner*—David Vu
*Attorney, Agent, or Firm*—Zarley, McKee, Thomte, Voorhees & Sease

[57] ABSTRACT

A line current filter for less than 10% total harmonic distortion includes an isolation transformer having two mutually coupled coils connected to an AC power source and a voltage rectifier. A shunt circuit is connected in parallel to one of the mutually coupled coils. The shunt circuit is comprised of a series connected resistor and capacitor. The shunt circuit may also include a second resistor connected in parallel to the capacitor. A second capacitor is connected across the two mutually coupled coils between the isolation transformer and the DC rectifier.

20 Claims, 3 Drawing Sheets

LINE CURRENT FILTER FOR LESS THAN 10% TOTAL HARMONIC DISTORTION

BACKGROUND OF THE INVENTION

1. Field of the Invention

The present invention relates to circuits for driving gas discharge lighting circuits. More particularly, the invention relates to a circuit having a line current filter which improves the performance of the circuit.

2. Problems in the Art

In a typical prior art circuit for driving a gas discharge lamp load, the lamp is driven by an AC voltage supply via a rectifier and high frequency power inverter. The load is coupled to the inverter by a transformer. One goal in designing an electronic ballast circuit is to optimize the power line input performance, namely the total harmonic distortion (THD) and the power factor (PF). Various factors effect the THD and PF. Therefore, designs that increase the PF or decrease the THD are desirable. Prior art ballast circuits use various techniques to improve the power factor or total harmonic distortion. However, these techniques are often inefficient, uneconomical, introduce noise into the system, require excess power, etc. For many years the effort for achieving THD in line current of less than 10% has not been economically successful using passive components. Some prior art circuits attempt to overcome the problem of poor power line input performance through various correction schemes including passive harmonic traps or active boost converters. However, circuits using these power factor correcting schemes typically require more components, involve more loss, introduce more noise, and are more expensive. In addition, many prior art circuits operate at a high temperature and require a heat dissipation means.

OBJECTS OF THE INVENTION

A general object of the present invention is the provision of an electronic ballast for driving a lamp load.

A further object of the present invention is the provision of an electronic ballast for driving a lamp load which includes a input line current filter.

A further object of the present invention is the provision of an electronic ballast having an input line current filter which provides less than 10% total harmonic distortion in line current.

A further object of the present invention is the provision of an electronic ballast having an input line current filter which provides greater than 95% input power factor correction.

A further object of the present invention is the provision of an electronic ballast having an input line current filter which reduces the inrush current into the diode bridge rectified power supply.

A further object of the present invention is the provision of an electronic ballast having an input line current filter which reduces the radio frequency interference (RFI) noise.

A further object of the present invention is the provision of an electronic ballast having an input line current filter which includes a pair of mutually coupled coils connected between the AC power source and a voltage rectifier.

A further object of the present invention is the provision of an electronic ballast having an input line current filter which includes a shunt circuit connected across one of the coils.

A further object of the present invention is the provision of an electronic ballast having an input line current filter having a shunt circuit across one of the coils which includes a resistive and capacitive network.

A further object of the present invention is the provision of an electronic ballast having an input line current filter which includes an inductor connected between one of the coils and the AC power source.

A further object of the present invention is the provision of an electronic ballast having an input line current filter having a pair of mutually coupled coils which produce fields that are additive.

A further object of the present invention is the provision of an electronic ballast having an input line current filter having a pair of mutually coupled coils wound around the same core.

These as well as other objects of the present invention will become apparent from the following specification and claims.

SUMMARY OF THE INVENTION

A line current filter for an electronic ballast of the present invention uses an isolation transformer having two mutually coupled coils connected between an AC power source and a DC rectifier. An impedance branch is connected in parallel to one of the coils. The circuit also uses an impedance amplifier connected to the isolation transformer to increase the impedance between the AC power source and the DC rectifier.

The impedance branch may include a resistor and capacitor in series. The impedance branch may optionally include a resistor and capacitor in series with an additional resistor in parallel with the capacitor. The impedance amplifier may be comprised of a capacitor connected across the isolation transformer coils between the isolation transformer and the DC rectifier.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalences which may be included within the spirit and scope of the invention.

Figure 1:
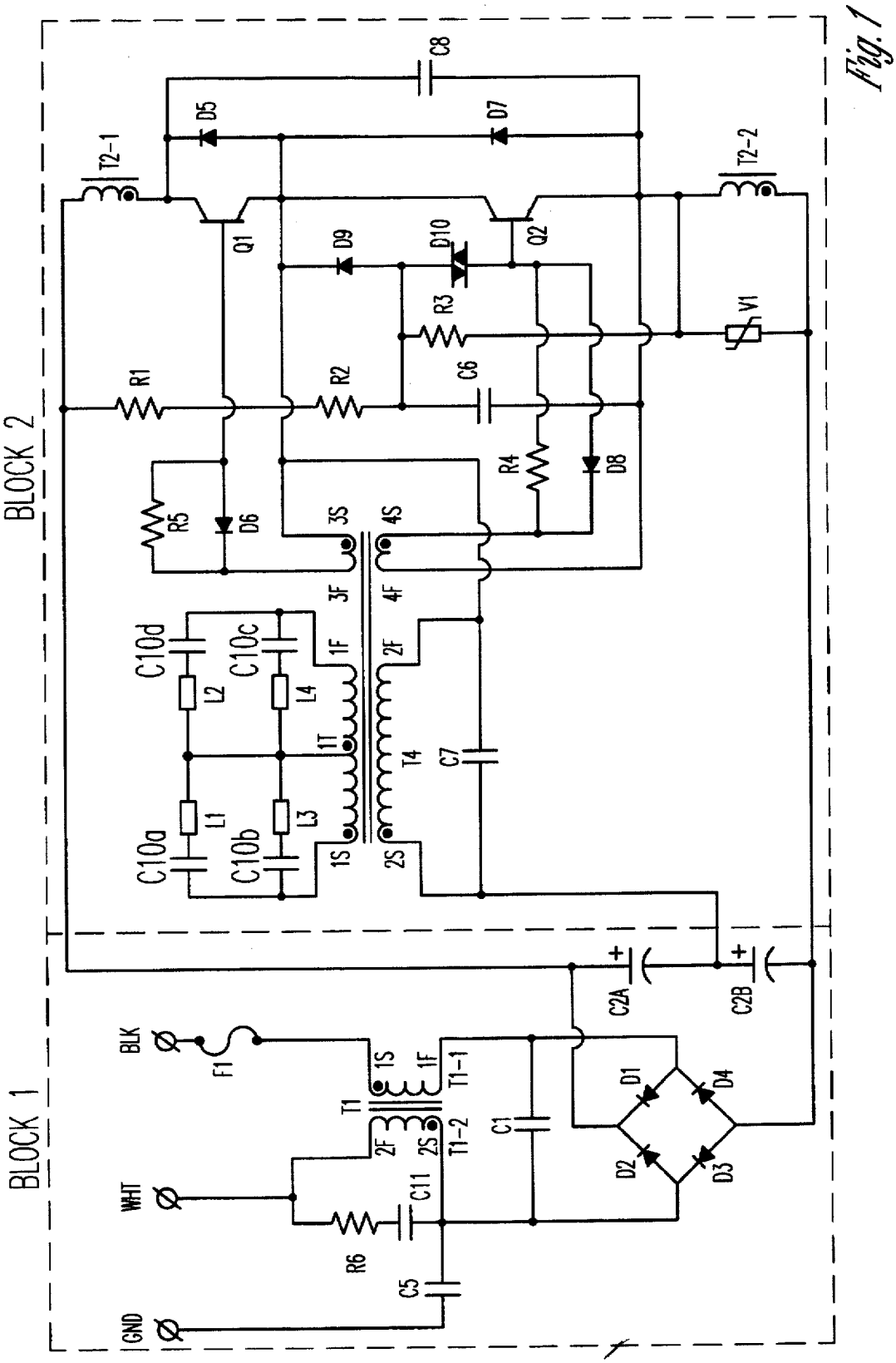
FIG. 1 is a schematic diagram of the present invention.
Figure 2:
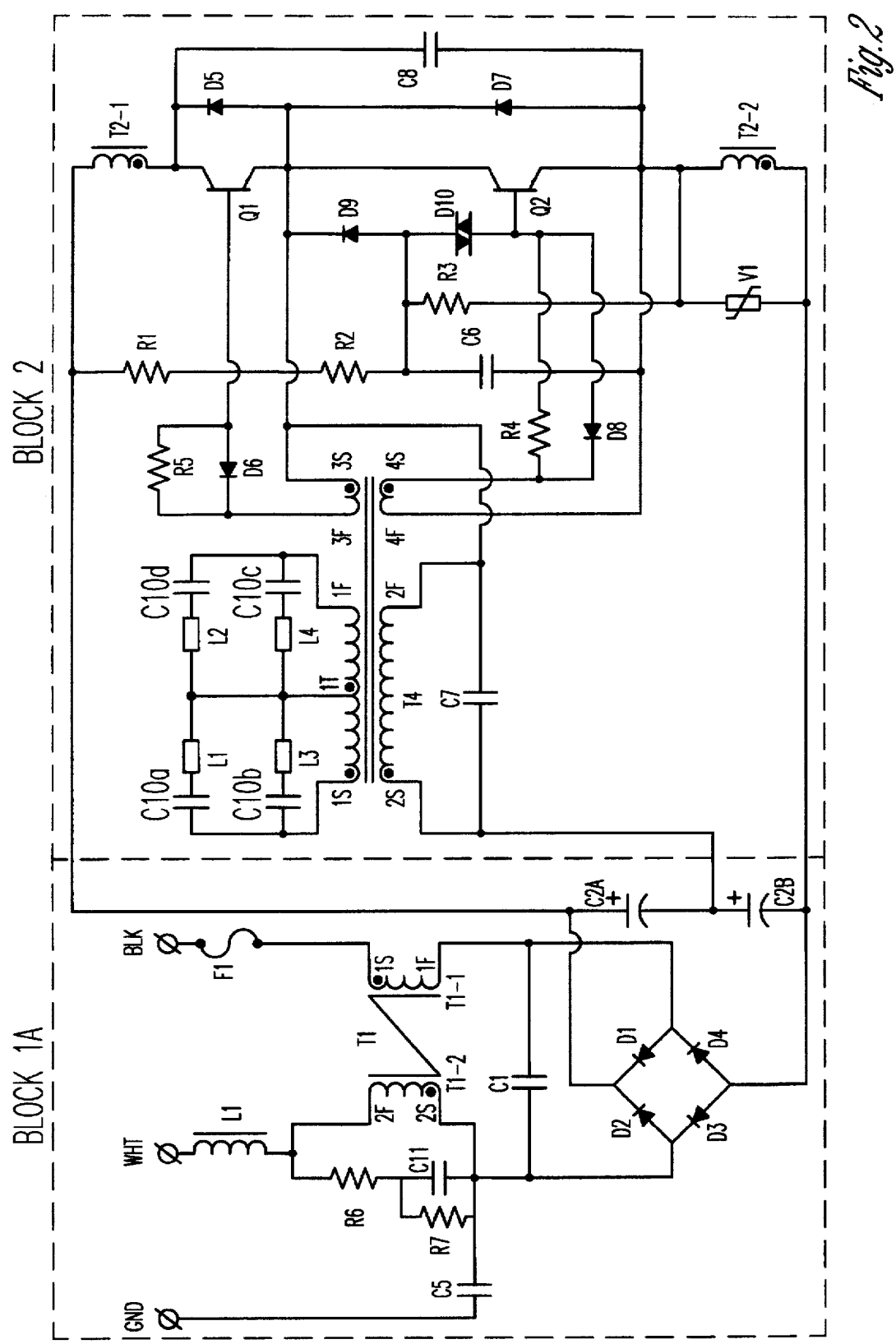
FIG. 2 is a schematic diagram of an alternative embodiment of the present invention.
Figure 3:
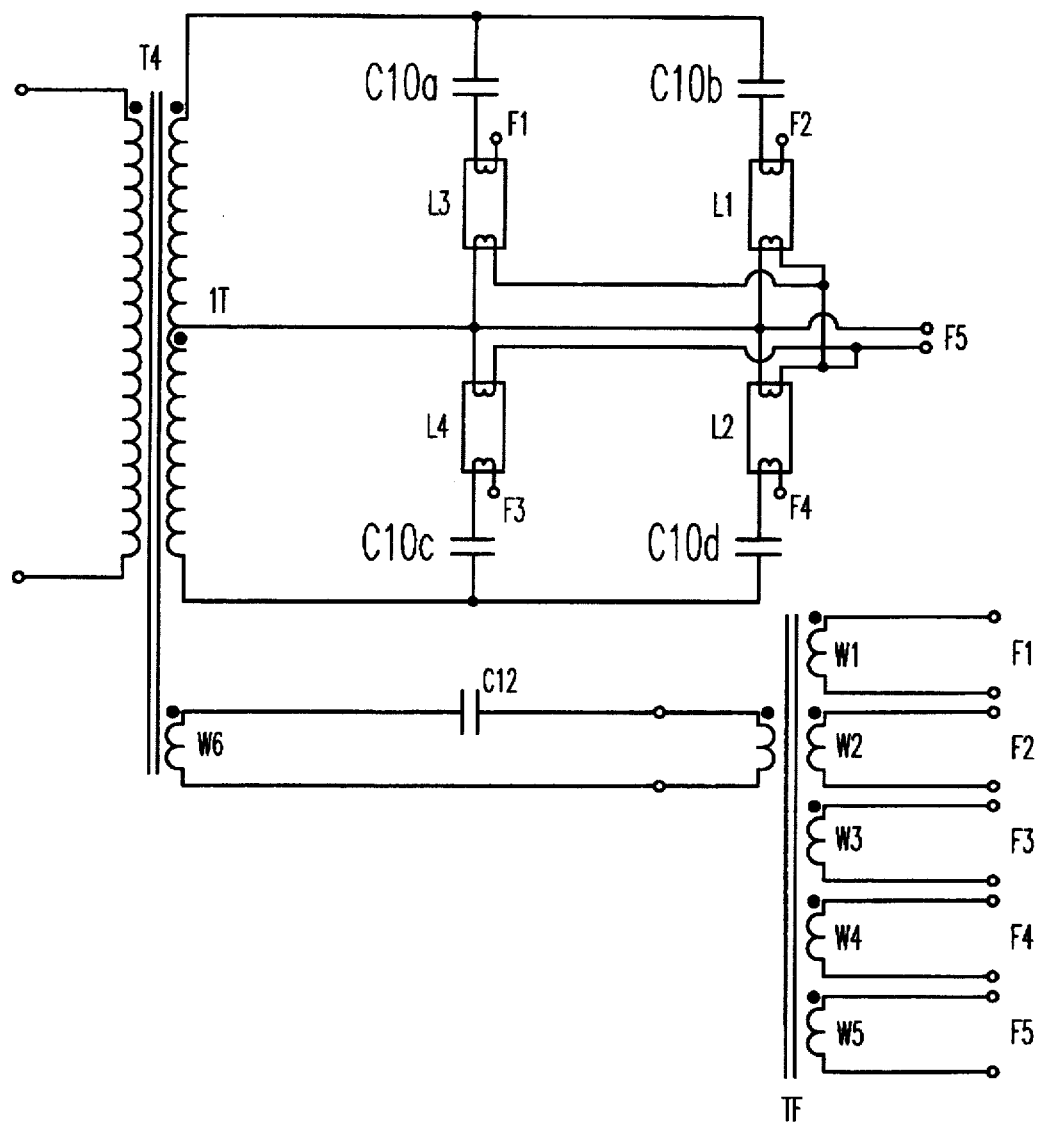
FIG. 3 is a schematic diagram of an alternative embodiment of the present invention using a filament transformer.

FIGS. 1 and 2 each show one embodiment of an electronic ballast of the present invention. Block 1 in FIG. 1 and Block 1A in FIG. 2 each show the input stage for the electronic ballast. The electronic ballast has a passive network at the input stage to provide less than 10% THD in line current and greater than 95% power factor correction. The input stage includes filtering necessary to meet FCC requirements regarding conducted emissions and American National Standards Institute (ANSI) input transient requirements. Blocks 1 and 1A also each include a full wave bridge rectifier and capacitors C2A and C2B. Block 2 in FIGS. 1 and 2 is connected to Blocks 1 and/or 1A and includes a DC to AC high frequency power inverter. Block 2 also includes the output stage of the ballast which includes a load transformer T4 connected to four lamps L1–L4. FIG. 3 shows an optional filament transformer TF coupled to the output transformer T4.

Block 1 in FIG. 1 and Block 1A in FIG. 2 each show the input stage of the electronic ballast which includes an EMI and transient suppression filter. An AC input line voltage is provided at the connections labeled BLK and WHT. The ballast is also connected via capacitor C5 to a ground connection labeled GND. A fuse F1 is connected between the BLK line and the input filter to protect the circuit from a surge of current.

The input filter shown in Block 1 in FIG. 1 is comprised of an isolation transformer T1 having two mutually coupled coils T1-1 and T1-2, a shunt capacitor C1, capacitor C11, and resistor R6. The mutually coupled coils T1-1 and T1-2 are preferably wound around the same core and have a polarity in such a way that the magnetic fields produced by the two coils are additive. Coil T1-1 is connected between the "hot" line BLK of the AC voltage source and one of the AC inputs of the diode bridge rectifier at diodes D1 and D4. Coil T1-2 is connected between the neutral line WHT of the AC power source and the other AC input of the diode bridge rectifier at diodes D2 and D3. Resistor R6 and capacitor C11 are connected in series with each other and together are connected parallel to coil T1-2. Connected between coils T1-1 and T1-2 and the diode bridge rectifier is a capacitor C1 which couples coils T1-1 and T1-2.

Coils T1-1 and T1-2 and capacitor C1 together form a second order low pass filter that attenuates harmonic currents generated by the two capacitors C2A and C2B. The capacitor C1 appears as a short circuit or a very low impedance path to high frequency harmonic currents and RFI differential mode noises. Coils T1-1 and T1-2 appear as very high impedance elements to harmonic current and relatively low impedance elements to the fundamental frequency (60 Hz for example). Capacitor C1 also performs power factor correction in the circuit.

Capacitor C11 and resistor R6 are provided for THD fine-tune adjustment. Resistor R6 is used to eliminate any ringing produced by coil T1-2 and capacitor C11. The role of capacitor C11 is impedance "amplification". Capacitor C11 increases the series impedance between the neutral line WHT and one of the two AC inputs of the diode bridge DC power supply. The impedance "amplification" is achieved according to the following equation:

$$Z_{total} = [(jXl) * (-jXc)]/[(jXl) + (-jXc)]$$
$$= (Xl * Xc)/[j(Xl - Xc)] \text{ Ohms.}$$

Hence, $|Z_{total}|=|(X1*Xc)/(X1-Xc)|>X1$ or $Xc$ alone.

where: $Z_{total}$: Complex impedance
| |: Absolute value operator
$Xl$: Reactance of coil T1-2.
$Xc$: Reactance of capacitor C11.

The input stage filter also suppresses RFI conducted noises generated by the ballast. This is accomplished by the configuration of the isolation transformer T1 and the capacitors C1 and C5.

Block 1A in FIG. 2 shows another embodiment of an AC filter functioning as a link between the AC voltage source and the rectified DC power supply. As shown in Block 1A, resistor R7 is connected parallel to capacitor C11. The parallel combination of resistor R7 and capacitor C11 is connected in series with the resistor R6. An addition, Inductor L1 is connected in series with coil T1-2 between coil T1-2 and the neutral line WHT of the AC voltage source. Resistors R6 and R7 are used to eliminate any ringing produced by coil T1-2 and capacitor C11. As discussed above, the role of capacitor C11 is impedance "amplification". Inductor L1 and coil T1-1 help reduce RFI noises being injected into the AC voltage source. They also improve the THD and reduce in rush current into the diode bridge rectifier. The circuit shown in FIG. 2 can reduce the AC line current distortion down to less than 10% while providing a very high power factor and RFI noise immunity to AC power sources.

Block 1 in FIG. 1 and Block 1A in FIG. 2 each include a full wave bridge rectifier comprised of diodes D1–D4. The voltage rectifier receives the 60 Hz AC voltage and converts it to DC voltage. The rectified DC voltage containing a high 120 Hz AC ripple is smoothed out by two electrolytic capacitors C2A and C2B. The diodes D1–D4 and the capacitors C2A and C2B represent a nonlinear load to the AC voltage source. As a result, a highly nonsinusiodal AC current is drawn which causes harmonic distortion. However, this harmonic distortion is reduced through the filtering discussed above. The voltage rectifier is connected to the high frequency power inverter shown in Block 2 and discussed below.

Block 2 in FIGS. 1 and 2 includes a DC to AC high frequency power inverter as well as a load transformer connected to a lamp load. The ballast uses a half-bridge current fed inverter circuit to reduce component stress and to improve the efficiency and high frequency operation. The high frequency power inverter is comprised primarily of transistors Q1 and Q2 and their related components, and the parallel resonant tank formed by the capacitor C7 and output transformer T4. The inverter is connected to the input stage at the two electrolytic capacitors C2A and C2B of Block 1. The DC current supplied by the capacitors C2A and C2B is inverted into high frequency AC current by the power inverter.

The power inverter operates as follows. When transistor Q1 is turned on, DC current will flow out of capacitor C2A through winding T2-1, transistor Q1, and to the right end of the resonant tank (formed by transformer T4 and capacitor C7) and back to capacitor C2A. This completes the positive half-cycle. Transformer T4 has two small coils that are used to drive the bases of transistors Q1 and Q2. Resistors R4 and R5 and diodes D6 and D8 are used to control the amount of current provided to the bases of transistors Q1 and Q2. The current flowing through the windings of transformer T4 in this direction causes transistor Q1 to turn off and transistor Q2 to turn on. As transistor Q1 turns off and transistor Q2 turns on, transistor Q1 becomes an open circuit while transistor Q2 becomes a closed circuit. The DC current then flows out of capacitor C2B into the resonant tank, through transistor Q2 and winding T2-2, and back to capacitor C2B. This completes the negative half-cycle. With the current flowing in this direction, the windings of transformer T4 cause transistor Q1 to turn on and transistor Q2 to turn off. The high frequency inverter keeps oscillating in this fashion.

To initiate the oscillations, a trigger or start-up circuit is required. As shown in Block 2, the trigger circuit consists of R1, R2, R3, capacitor C6, diac D10, and diode D9. Resistors R1, R2 and R3 act as a voltage divider to provide the desired voltage to capacitor C6. As current flows through resistors R1 and R2, capacitor C6 charges up. When capacitor C6 is charged to the threshold voltage of diac D10, the diac D10 will conduct and turn on transistor Q2. Diac D10 is used to prevent the base driving signal from reaching capacitor C6. Diode D9 keeps capacitor C6 discharged once the oscillation has begun.

Diodes D5, D7, capacitor C8, and metal oxide varistor V1 shown in Block 2 provide a means to protect transistors Q1 and Q2 by suppressing transient spikes. Varistor V1 is placed across one of the windings of inductor T2 (winding T2-2 in FIGS. 1 and 2). Placing varistor V1 across one of the windings of T2 rather than in parallel with capacitor C8 reduces the required size (and therefore price) of varistor V1 and also decreases the electrical stress. The maximum collector to emitter voltage of transistor Q1 or Q2 is limited to the value determined by the following equations:

$$Vcemax = V_{C2A} + V_{C2B} + 2*V_{V1} = 2*VC8 + 2V_{V1} = Vbus + 2*V_{V1} \text{ Volts}$$

Where:

$V_{V1}$ is the rated voltage of the metal oxide varistor V1.

Vbus is the voltage between the positive side of capacitor C2A and the negative side of capacitor C2B (Block 1).

Under normal operation, the maximum voltage of each transistor Q1 or Q2 will see is given by the following equation:

$$Vcemax = Vbus*PI/2 \text{ volts}$$

Where: $PI = 3.1416$

The RMS voltage across the resonant tank is determined by the following formula:

$$Vpri = 0.55*Vbus \text{ Volts}$$

and the operating frequency is approximately given by:

$$f = 1/[2*PI*sqrt(Lpri*Cpri)] Hz$$

Where:

Lpri is the primary inductance of transformer T4,

Cpri is the total capacitance seen looking into the primary side of transformer T4.

Unexpectedly, the high frequency AC voltage developed across the current feeding inductor T2 is independent of the operating frequency and load. This AC voltage is a linear function of the AC input voltage by the following equation:

$$V_{T2} = V_{ACinput}/3$$

Where:

VT2 is the AC voltage across inductor T2.

VACinput is the input AC voltage of the ballast.

In the configuration shown in FIGS. 1 and 2, the transformer T4 has a center tap 1T on one of its secondary windings. Each of the half windings around center tap 1T is used to drive the four lamps L1–L4. The configuration shown in FIGS. 1 and 2 reduces the open circuit voltage resulting in a reduction of apparent power being circulated in the transformer. As a result, the efficiency is improved. The lamp currents are limited by capacitors C10A–C10D. Note that the circuit is capable of driving different numbers of lamps, for example, two 8' lamps, four 4' lamps, etc.

An optional filament transformer TF is shown in FIG. 3. The filament transformer TF is used to drive the filaments of the lamps L1–L4. The filament transformer TF is coupled to the load transformer T4 by an auxiliary winding W6. Filament transformer TF has one primary winding W6 and five secondary windings (W1–W5). The secondary windings W1–W5 of filament transformer TF are used to drive the various high voltage filaments of the lamps as shown in FIG. 3. The secondary windings W1–W5 of the filament transformer TF are preferably well separated geometrically from the primary winding W6 of the filament transformer TF. The windings are not layer wound but rather are sector wound to create the separation. This separation creates a leakage inductance which limits filament current during shorted filament conditions. If one of the secondary windings is shorted, the input circuitry does not recognize the short. This in turn protects the ballast during a shorted filament condition. As a result, if two of the leads are shorted, the ballast will not fail.

Table 1 lists the values for the components of the preferred embodiment. While these are the preferred values of the components, it will be understood that the invention is not limited to these values.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

TABLE 1

| ITEM | DESCRIPTION | VALUE or PART NUMBER for a 277 VAC MODEL |
|---|---|---|
| R1 | Resistor | 150 K, ½ W, 5%, CF |
| R2 | Resistor | 150 K, ½ W, 5%, CF |
| R3 | Resistor | 47 K, ½ W 5%, CF |
| R4 | Resistor | 39 Ohm, ½ W, 5%, CF |
| R5 | Resistor | 39 Ohm, ½ W, 5%, CF |
| R6 | Resistor | 56 Ohm, 1 W, 5%, CF |
| R7 | Resistor | 20 K, 1 W, 5%, CF |
| C1 | Capacitor | .68 μF, 630 V, 10%, MEF |
| C2A | Capacitor | 47 μF, 250 V, 20%, ELECTROLYTIC |
| C2B | Capacitor | 47 μF, 250 V, 20%, ELECTROLYTIC |
| C5 | Capacitor | 3300 PF, 2 KV, 20%, CERAMIC |
| C6 | Capacitor | .1 μF, 50 V, 20%, CERAMIC |
| C7 | Capacitor | .015 μF, 630 V, 5%, MPP |
| C8 | Capacitor | .0068 μF, 1000 V, 5%, MPP |
| C10A | Capacitor | 2300 PF, 2500 V, 5%, MPP |
| C10B | Capacitor | 2300 PF, 2500 V, 5%, MPP |
| C10C | Capacitor | 2300 PF, 2500 V, 5%, MPP |
| C10D | Capacitor | 2300 PF, 2500 V, 5%, MPP |
| C11 | Capacitor | .56 μF, 400 V, 10%, MEF |
| D1 | Diode | 1N4007GP |
| D2 | Diode | 1N4007GP |
| D3 | Diode | 1N4007GP |
| D4 | Diode | 1N4007GP |
| D5 | Diode | FR107GP |
| D6 | Diode | SCHOTTKY 40 V, 1A |
| D7 | Diode | FR107GP |
| D8 | Diode | SCHOTTKY, 40 V, 1A |
| D9 | Diode | FR107GP |
| D10 | Diac | 32 V |
| Q1 | Transistor | BUL 312 |
| Q2 | Transistor | BUL 312 |
| V1 | Varistor | TNK9G221K |
| T1 | Transformer | 330 mH per coil |

What is claimed is:

1. An input filter for filtering the AC input power provided to a voltage rectifier by an AC power source for a circuit for driving a gas discharge lamp load comprising:

first and second mutually coupled coils, said first coil being connected to the AC power source and to a first connection point of the voltage rectifier, said second coil being connected to the AC power source and to a second connection point of the voltage rectifier; and an impedance circuit connected in parallel to one of said mutually coupled coils, said impedance circuit comprising a first resistive element and a first capacitive element connected in series with each other and a second resistive element connected parallel to said first capacitive element.

2. The input filter of claim 1 further comprising an inductor connected between said second coil and said AC power source.

3. The input filter of claim 1 further comprising a coupling element connected across said first and second coils and across said first and second connection points of the voltage rectifier.

4. The input filter of claim 5 wherein said coupling element is a capacitor.

5. The input filter of claim 1 further comprising a second capacitive element connected between said second coil and a ground.

6. The input filter of claim 1 further comprising a core operatively coupled to said first and second mutually coupled coils.

7. The input filter of claim 6 wherein said first and second mutually coupled coils are wound around said core.

8. The input filter of claim 7 wherein the polarities of said first and second coils cause the coils to produce electric fields which are additive.

9. A circuit for driving a gas discharge lamp load comprising:
an input stage for receiving an AC input voltage from an AC voltage source and rectifying the input voltage to create a DC voltage source;
an input filter coupled to said input stage, said input filter further comprising:
first and second mutually coupled coils connected between the AC voltage source and the DC voltage source,
an impedance circuit parallel coupled to said second mutually coupled coil, said impedance circuit being comprised of at least a first resistive element, a first capacitive element, and a second resistive element connected parallel to said first capacitive element;
a power inverter operatively connected to the DC voltage source; and
an output stage connected to the power inverter for driving a gas discharge lamp load.

10. The circuit of claim 9 further comprising an inductor connected between one of said mutually coupled coils and said AC power source.

11. The circuit of claim 9 further comprising a second capacitive element connected between one of said mutually coupled coils and a ground.

12. The circuit of claim 9 wherein said first and second mutually coupled coils are wound around a common core.

13. The circuit of claim 12 wherein the polarities of said first and second mutually coupled coils cause the coils to produce magnetic fields that are additive with each other.

14. The input filter of claim 11 further comprising an inductor connected to said transformer between said transformer and said AC power source.

15. An input filter for an electronic ballast comprising:
a transformer connected between an AC power source and a DC rectifier, said transformer having at least two coils; and
an impedance amplifier parallel coupled to one of said coils to increase the impedance between the AC power source and the DC rectifier, wherein said impedance amplifier is comprised of a resistive element and a capacitive element connected in series with each other, and a second resistive element connected in parallel to said capacitive element.

16. The input filter of claim 15 wherein said at least two coils are mutually coupled coils.

17. The input filter of claim 15 wherein said input filter further comprises a capacitor connected across said at least two coils between said coils and said DC rectifier.

18. A method of filtering the AC input power for an electronic ballast comprising:
connecting an isolation transformer between an AC power source and a DC rectifier, said isolation transformer having at least two coils; and
connecting an impedance circuit in parallel to one of said coils to amplify the impedance between the AC power source and the DC rectifier, wherein said impedance circuit is comprised of a resistor and a first capacitor connected in series and a second resistor connected in parallel to said capacitor.

19. The method of claim 14 further comprising the step of connecting a second capacitor across said capacitor at least two coils between said isolation transformer and said DC rectifier.

20. The method of claim 18 further comprising the step of connecting a second capacitor across said at least two coils between said transformer and said DC rectifier.

* * * * *